(12) United States Patent
Wied et al.

(10) Patent No.: US 8,015,713 B2
(45) Date of Patent: Sep. 13, 2011

(54) PORTABLE HANDHELD WORK APPARATUS

(75) Inventors: Günter Wied, Leutenbach (DE); Uwe Gaese, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 452 days.

(21) Appl. No.: 12/232,016

(22) Filed: Sep. 10, 2008

(65) Prior Publication Data

US 2009/0113724 A1    May 7, 2009

(30) Foreign Application Priority Data

Nov. 7, 2007   (DE) .......................... 10 2007 052 944

(51) Int. Cl.
*A01G 3/06* (2006.01)
(52) U.S. Cl. .......................................... 30/276; 56/12.7
(58) Field of Classification Search .................... 30/276, 30/286; 56/16.7, 255–256, 12.7
See application file for complete search history.

(56) References Cited

U.S. PATENT DOCUMENTS

| | | | |
|---|---|---|---|
| 4,817,738 A * | 4/1989 | Dorner et al. .................. 30/276 |
| 4,841,929 A * | 6/1989 | Tuggle et al. ................... 30/276 |
| 5,774,993 A | 7/1998 | Schlessmann | |
| 5,855,069 A * | 1/1999 | Matsubayashi et al. ........ 30/276 |
| 6,105,258 A * | 8/2000 | Akaike ............................ 30/276 |
| 6,523,508 B2 * | 2/2003 | Husges et al. ............. 123/41.65 |
| 6,550,145 B2 * | 4/2003 | Stoll et al. ....................... 30/276 |
| 7,070,009 B2 * | 7/2006 | Kawamoto et al. ........... 173/211 |
| 2005/0006114 A1 * | 1/2005 | Racov et al. ................ 173/162.1 |
| 2007/0044321 A1 * | 3/2007 | Kocha ............................. 30/276 |

* cited by examiner

*Primary Examiner* — Stephen Choi
(74) *Attorney, Agent, or Firm* — Walter Ottesen

(57) ABSTRACT

A portable handheld work apparatus has a housing (2) which has at least one intake opening (20). A drive motor (4) is mounted in the housing (2) and this drive motor drives a fan wheel (9). The fan wheel (9) inducts a cooling airflow (26) into the housing (2) through the intake opening (20). The cooling airflow (26) is moved to the drive motor (4) by the fan wheel (9). A driven drive element rotating about the rotational axis (35) is provided. To prevent a wrapping of long-fibrous material onto the rotating drive element, it is provided that the drive element is surrounded at least partially by a wrap protector (19, 39) fixed to the housing. The wrap protector has a radially outwardly directed flange (28) referred to the rotational axis (35). The flange (28) is at a distance (a) to an adjacent, rotatably driven component.

18 Claims, 3 Drawing Sheets

PORTABLE HANDHELD WORK APPARATUS

CROSS REFERENCE TO RELATED APPLICATION

This application claims priority of German patent application no. 10 2007 052 944.0, filed Nov. 7, 2007, the entire content of which is incorporated herein by reference.

BACKGROUND OF THE INVENTION

U.S. Pat. No. 5,774,993 discloses a portable handheld work apparatus, namely, a brushcutter wherein a fan wheel draws a cooling airflow into the housing of the work apparatus. The induction takes place in a region wherein the clutch is connected to the drive shaft. A sleeve-shaped flange is provided which terminates at the clutch drum at a distance thereto.

Long fiber material such as blades of grass or the like can be inducted through the intake openings during operation and can be drawn into the gap between the clutch drum and the sleeve. The material can wrap around the drive shaft and so affect operation.

SUMMARY OF THE INVENTION

It is an object of the invention to provide a portable handheld work apparatus which has a simple configuration and with which deleterious effects on operation because of inducted long-fibrous material can be avoided.

The portable handheld work apparatus of the invention includes: a housing having an air intake opening formed therein; a drive motor mounted in the housing; a fan wheel driven by the drive motor for drawing a cooling airflow into the housing through the air intake opening and for moving the cooling airflow to the drive motor; a drive element rotatably driven about a rotational axis; a wrap protector fixedly mounted in the housing and at least partially surrounding the drive element; the wrap protector having a radially outwardly directed flange referred to the rotational axis; a rotatably driven component; and, the flange being adjacent the component and disposed at a distance (a) from the component.

The flange, which is directed radially outwardly, together with the adjacent rotatably driven component, effects an airflow radially outwardly between the flange and the component. This airflow, which is directed outwardly, prevents long-fibrous material from reaching into the gap between the flange and the component. In this way, a wrapping of long-fibrous material around the drive element is avoided in a simple manner. The flange can be configured to be constructively simple so that a simple assembly of the work apparatus results.

Advantageously, a receptacle for the wraparound material is formed on the outer periphery of the wrap protector. The cooling airflow flows through the receptacle space in an approximately spiral shape. The spirally-shaped flow in the receptacle space permits the long-fibrous material to wrap onto the wrap protector. In this way, the rotating parts are protected against the wraparound material. The outer diameter of the wrap protector is greater than the outer diameter of the drive element because the wrap protector is disposed radially outside of the drive element. The tendency of wraparound material to wrap around is reduced because of the larger outer diameter. The spirally-shaped flow in the receptacle space and the radially outwardly directed flow behind the flange cause the wraparound material to remain in the receptacle space and to not be drawn further into the housing. The receptacle space is advantageously delimited by the flange.

Advantageously, the wrap protector is connected to the housing of the work apparatus outside of the receptacle space and at the side facing away from the fan wheel. The receptacle space is advantageously formed in the region of a cylindrical section of the wrap protector. The cylindrical configuration leads to the situation that wraparound material can collect in the region of the receptacle space. A movement of the wraparound material in the direction of the rotational axis out of the receptacle space is avoided by the cylindrical section. The movement out of the receptacle space would, for example, be facilitated by a conical inner surface.

The receptacle space extends continuously on the entire periphery of the cylindrical section of the wrap protector in order not to disturb the formation of the spirally-shaped flow. Accordingly, the receptacle space is not subdivided or interrupted by struts, adjusting walls or the like.

The distance between the flange and the adjacent rotating component advantageously amounts to approximately 0.5 mm to approximately 5 mm. This comparatively short distance ensures the formation of a drag flow between flange and component. At the same time, a contact between the component and the flange is reliably avoided even with intense vibrations or the like. The rotating component is advantageously the clutch drum of a clutch. The clutch is especially disposed between the drive element and the fan wheel. During operation, the cooling air advantageously flows along the outer periphery of the clutch to the fan wheel.

The work apparatus has at least one opening which connects the interior of the wrap protector to the ambient air. Ambient air can be drawn into the interior of the wrap protector through the opening and this inducted air exits in the gap formed between the flange and the adjacent rotating component. Advantageously, the wrap protector has at least one opening for inducting ambient air into the interior of the wrap protector and this opening is on the side facing away from the flange. This opening too makes possible the induction of an adequate quantity of ambient air. The drive element is advantageously journalled with a bearing. The bearing is disposed in the region of the wrap protector in order to ensure an adequate cooling of the bearing. Although the bearing is covered at the outside by the wrap protector, adequate cooling is, however, ensured in a simple manner because of the airflow between the wrap protector and the drive element which results during operation.

Advantageously, the wrap protector has means for a formtight fixation on the housing. The wrap protector is especially injection molded in the housing. Advantageously, an air lattice is additionally provided at a radial distance to the wrap protector between the intake opening for cooling air and the receptacle space. The air lattice also prevents a penetration of long-fibrous material. Long-fibrous material, which nonetheless gets into the region of the wrap protector, is wrapped up in the receptacle space and a further penetration into the housing is hindered by the airflow at the flange of the wrap protector.

The work apparatus is advantageously a brushcutter which has a guide tube wherein a drive shaft is rotatably journalled. The drive element connects the drive shaft to the drive motor. The guide tube advantageously has at least one opening for inducting ambient air into the interior of the wrap protector. In this way, it can be easily ensured that an adequate quantity of air is available for the radially outwardly directed flow between flange and adjacent component. The housing with the wrap protector is disposed at one end of the guide tube and the rotatably driven work tool is disposed at the opposite-lying end of the guide tube.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
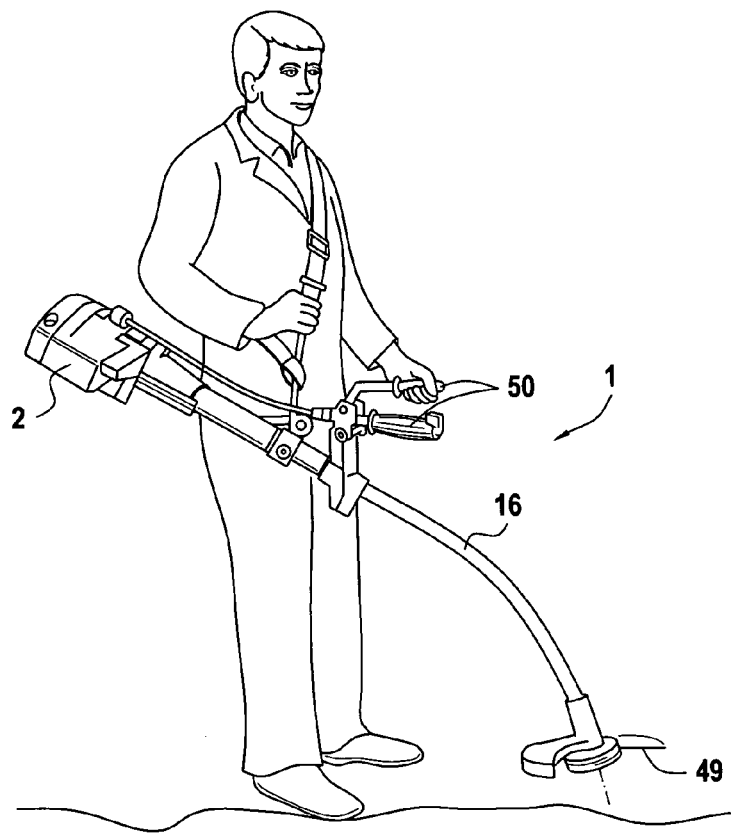
FIG. 1 is a schematic of a brushcutter.

FIG. 1 shows a brushcutter 1 which is carried by an operator. The brushcutter 1 includes a guide tube 16 on which two handles 50 are fixedly mounted for guiding the brushcutter. A filament cutting head is arranged on the one end of the guide tube 16 facing toward the ground and this filament cutting head has a rotatably driven cutting filament 49. A housing 2 of the brushcutter 1 is mounted on the opposite-lying end of the guide tube 16.

Figure 2:
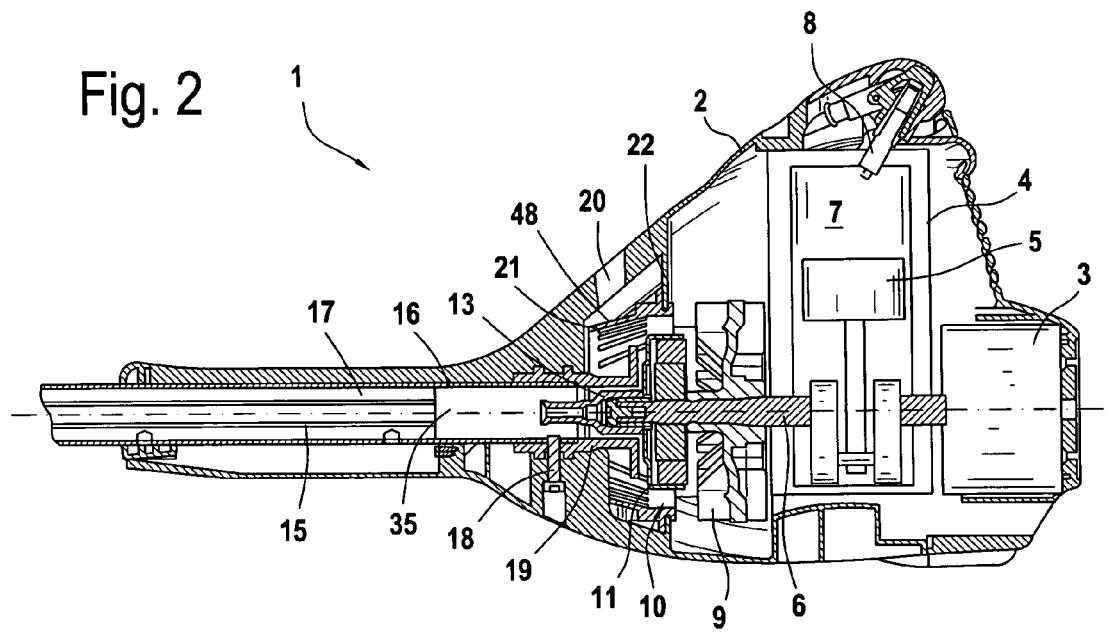
FIG. 2 is a schematic section view through the housing of the brushcutter of FIG. 1.
Figure 3:
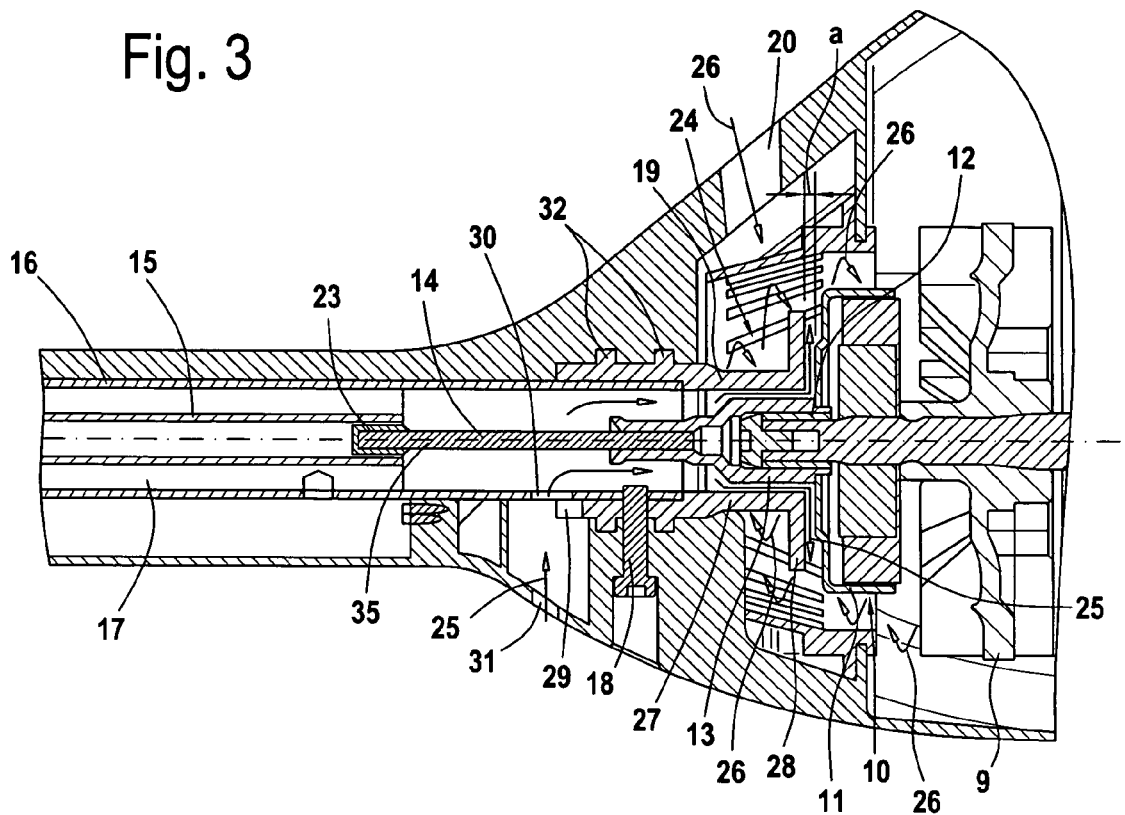
FIG. 3 is an enlarged detail from FIG. 2.

FIG. 2 shows a section through the housing 2. The brushcutter 1 has a drive motor 4 which is mounted in the housing 2 and is configured as an internal combustion engine. The drive motor 4 is advantageously a two-stroke engine or a mixture-lubricated four-stroke engine. The drive motor 4 can, however, also be an electric motor. A starter unit 3 serves for starting the drive motor 4. The engine 4 has a piston 5 which delimits a combustion chamber 7 and rotatably drives a crankshaft 6 about a rotational axis 35. A spark plug 8 projects into the combustion chamber 7. A fan wheel 9 is mounted on the crankshaft 6 so as to rotate therewith and is driven by the engine 4. The fan wheel 9 is connected to a connecting support 13 via a centrifugal clutch 10. The connecting support 13 is rotatably journalled on the crankshaft 6 by a bearing 12 (FIG. 3) and is connected to a clutch drum 11 of the centrifugal clutch 10 so that the connecting support rotates therewith. As shown in FIG. 3, the connecting support 13 is connected to a drive shaft 15 via a polygon shaft 14. The polygon shaft 14 especially has a rectangular cross section or a quadratic cross section. The connecting support 13 thereby forms a drive element for the drive shaft 15. The polygon shaft 14 is inserted into a sleeve 23 which is mounted in the drive shaft 15 configured as a hollow shaft. The drive shaft 15 is journalled via a bearing sleeve 17 in the guide tube 16. The bearing sleeve 17 surrounds the drive shaft 15 over a large portion of the length of the drive shaft 15 and has outwardly projecting struts which are braced in the guide tube 16.

Induction openings 20 are provided in the housing 2 for inducting cooling air for the engine 4. One of these induction openings 20 is shown schematically in FIG. 2. The induction opening 20 is disposed at the elevation of the connecting support 13 referred to the rotational axis 35. An air lattice 21 is provided radially within the intake opening 20. The air lattice 21 has a plurality of slots 41 for the passthrough of cooling air and is held in a wall 22 of the housing 2. The connecting support 13 is surrounded by a wrap protector 19 which is held in the housing so that it cannot rotate. A screw 18 is provided for the fixation of the wrap protector 19 and of the guide tube 16. The screw threadably engages the guide tube 16 in a radial direction through the wrap protector.

The configuration of the wrap protector 19 will be explained in greater detail with reference to FIGS. 3 and 4.

Figure 4:
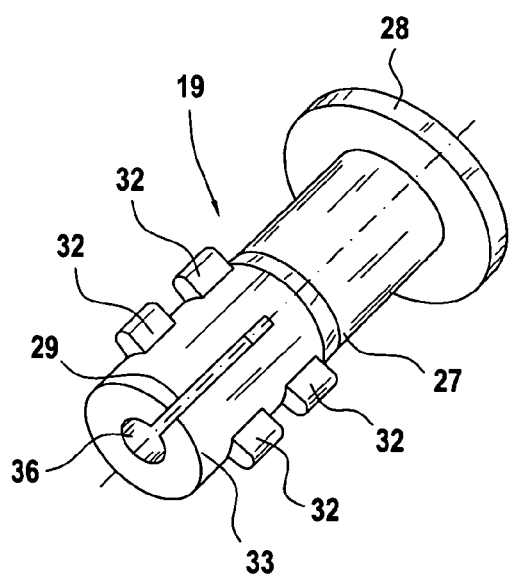
FIG. 4 is a schematic perspective view of the wrap protector.

As FIGS. 3 and 4 show, the wrap protector 19 has a cylindrical section 27 which surrounds the connecting support 13 at a short radial distance therefrom. The cylindrical section 27 is disposed within the air lattice 21. The wrap protector 19 has a radially outwardly projecting flange 28 at the end thereof facing toward the clutch drum 11. The flange 28 and the cylindrical section 27 conjointly delimit a receiving space 24 for the long-fibrous material. The flange 28 covers a large portion of the side of the clutch drum 11 facing toward the receptacle space 24. The flange 28 is at a distance (a) from the clutch drum 11 in the direction of the rotational axis 35. The distance (a) advantageously is approximately 0.5 mm to approximately 5 mm. A distance (a) of approximately 2 mm is seen to be especially advantageous.

Because of the distance (a) and because of the distance between the connecting support 13 and the cylindrical section 27 in radial direction, air can be inducted from the guide tube 16 into the gap formed between the flange 28 and the clutch drum 11 during operation. Because of the developing drag flow which is generated by the rotation of the clutch drum 11, a radially outwardly directed airflow 25 results between the flange 28 and the clutch drum 11.

The wrap protector 19 overlaps the guide tube 16. In order to ensure an adequate air supply into the interior of the wrap protector, the guide tube 16 has an opening which is configured as a slot 30. The slot 30 communicates with the ambient air via an opening 31 in the housing 2. The wrap protector 19 has a slot 29 in the region of the slot 30. The airflow 25 is shown schematically in FIG. 3 by arrows. The airflow 25 flows through the opening 31, the slot 30, the peripheral gap formed between the connecting support 13 and the wrap protector 19 and the gap running between the flange 28 of the wrap protector 19 and the clutch drum 11.

As shown in FIGS. 3 and 4, the wrap protector 19 has attachment nubs 32 on the section thereof which overlaps the guide tube 16. The attachment nubs 32 project radially outwardly and the housing 2 is injection molded thereover. The attachment nubs 32 are disposed in an attachment section 33 shown in FIG. 4. This attachment section has an essentially cylindrical configuration and is surrounded completely by the material of the housing 2.

In FIG. 3, the cooling airflow 26, which is moved by the fan wheel 9, is shown schematically. The cooling airflow 26 enters through the intake openings 20 into the housing 2. A spirally-shaped flow arises in the housing 2 because of the rotation of the fan wheel 9 and the clutch drum 11. This spirally-shaped flow flows over the cylindrical section 27 of the wrap protector 19. A circular annular flow can also be present in this region. The spirally-shaped flow causes the long-fibrous material, which reaches the region of the receptacle space 24, to be wrapped onto the cylindrical section 27 of the wrap protector 19 because of the airflow 26. The flange 28 prevents the long-fibrous material from being carried to the clutch drum 11 by the spirally-shaped cooling airflow 26. This is supported by the airflow 25 flowing radially outwardly between the flange 28 and the clutch drum 11.

As shown in FIG. 4, the wrap protector 19 has an opening 36 at its end face projecting into the guide tube 16 and air from the guide tube can enter into the wrap protector 19 via this opening 36.

Figure 5:
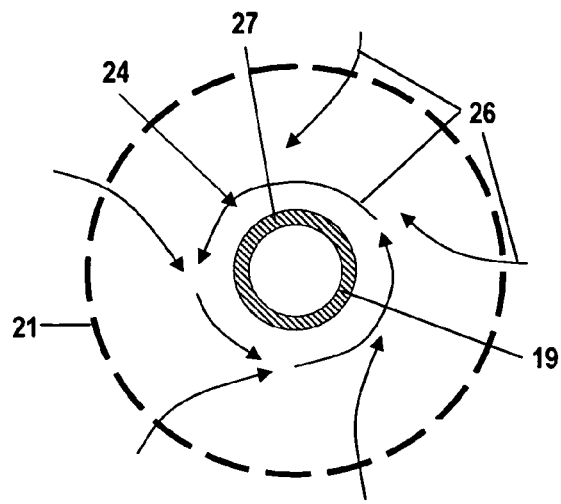
FIG. 5 is a schematic view of the flow in the region of the wrap protector; and, FIG. 6 is a schematic section view of an embodiment of a brushcutter which corresponds essentially to the embodiment shown in FIGS. 2 to 5.

In FIG. 5, the circular annularly-shaped or spirally-shaped cooling airflow 26, which forms between the air lattice 21 and the cylindrical section 27 of the wrap protector 19, is shown schematically.

Figure 6:
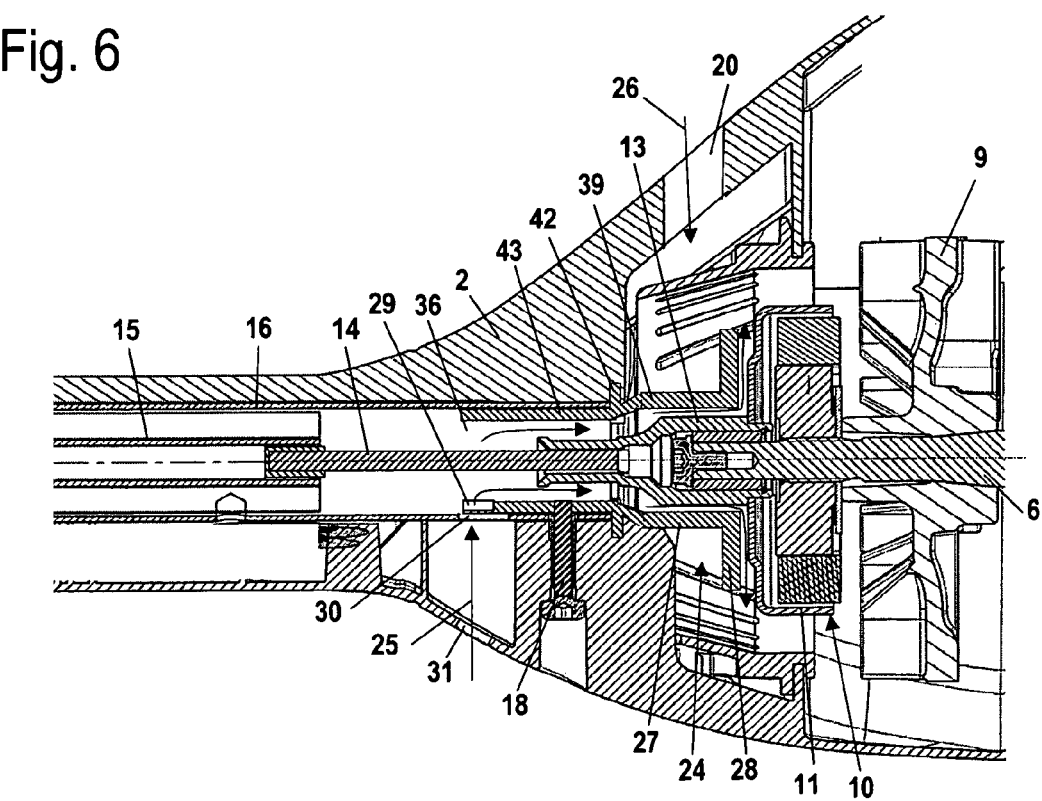

FIG. 6 shows an embodiment of a wrap protector 39 which corresponds essentially to the wrap protector 19 shown in FIGS. 2 to 5. The same reference numerals identify the same elements.

The wrap protector 39 likewise has a radially outwardly projecting flange 28 at a distance to the clutch drum 11. The wrap protector 39 differs from the wrap protector 19 in that the wrap protector 39 does not overlap the guide tube 16 but rather the wrap protector projects into the guide tube 16. A radially outwardly projecting attachment edge 42 is provided in order to delimit the insertion length of the wrap protector 39 into the guide tube 16. The attachment edge 42 is advantageously injection molded into the material of the housing 2. The section of the wrap protector 39, which projects into the guide tube 16, forms an attachment section 43 on which a slot 29 can be provided for the supply of cooling air. The further configuration of the wrap protector 39 corresponds to the configuration of the wrap protector 19.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus for cutting material, the apparatus comprising:
   a housing having an air intake opening formed therein;
   a drive motor mounted in said housing;
   a fan wheel driven by said drive motor for drawing a cooling airflow into said housing through said air intake opening and for moving said cooling airflow to said drive motor;
   a drive element rotatably driven about a rotational axis;
   a wrap protector fixedly mounted in said housing and at least partially surrounding said drive element to protect said drive element from a wrap around thereof of cut material entrained in said cooling airflow;
   said wrap protector having a radially outwardly directed flange referred to said rotational axis;
   a rotatably driven component; and,
   said flange being adjacent said component and said flange and said component conjointly defining a gap therebetween through which an outwardly directed airflow can pass during operation of said apparatus.

2. The portable handheld work apparatus of claim 1, wherein said wrap protector has an outer periphery and a receptacle space for wraparound material is formed at said outer periphery; and, said receptacle space is disposed so as to permit said cooling airflow to pass therethrough with an approximately spiral shape.

3. The portable handheld work apparatus of claim 2, said wrap protector having an end portion facing away from said fan wheel and disposed outside of said receptacle space; and, said wrap protector being connected to said housing at said end portion.

4. The portable handheld work apparatus of claim 3, wherein said wrap protector has a cylindrical section and said receptacle space is configured in the region of said cylindrical section.

5. The portable handheld work apparatus of claim 4, wherein said receptacle space extends continuously over the entire periphery of said cylindrical section.

6. The portable handheld work apparatus of claim 1, wherein said gap defines a distance (a) between said flange and said component which is between approximately 0.5 mm and approximately 5.0 mm.

7. The portable handheld work apparatus of claim 1, further comprising a clutch; and, said rotatably driven component is a clutch drum of said clutch.

8. The portable handheld work apparatus of claim 7, wherein said clutch is disposed between said drive element and said fan wheel so as to facilitate the flow of cooling air along the outer periphery of said clutch to said fan wheel.

9. The portable handheld work apparatus of claim 1, said wrap protector having an interior and said work apparatus further comprising an opening for connecting said interior to the ambient air.

10. The portable handheld work apparatus of claim 9, wherein said wrap protector has an end portion facing away from said flange; and, said end portion has an opening formed therein for inducting the ambient air into said interior of said wrap protector.

11. The portable handheld work apparatus of claim 1, further comprising a bearing for journaling said drive element; and, said bearing being disposed in the region of said wrap protector.

12. The portable handheld work apparatus of claim 1, wherein said wrap protector has means for form-tightly fixing said wrap protector in said housing.

13. The portable handheld work apparatus of claim 2, further comprising an air lattice disposed between said air intake opening and said receptacle space at a radial distance to said wrap protector.

14. The portable handheld work apparatus of claim 1, wherein said work apparatus is a brushcutter having a guide tube and a drive shaft rotatably journalled therein; and, said drive element connects said drive shaft to said drive motor.

15. The portable handheld work apparatus of claim 14, wherein said wrap protector has an interior and said guide tube has an opening formed therein for inducting ambient air into said interior.

16. The portable handheld work apparatus of claim 14, further comprising a rotatably driven work tool; said guide tube having a first end and a second end lying opposite said first end; and, said housing with said wrap protector being mounted on said first end and said rotatably driven work tool being mounted on said second end.

17. A portable handheld work apparatus comprising:
   a housing having an air intake opening formed therein;
   a drive motor mounted in said housing;
   a fan wheel driven by said drive motor for drawing a cooling airflow into said housing through said air intake opening and for moving said cooling airflow to said drive motor;
   a drive element rotatably driven about a rotational axis;
   a wrap protector fixedly mounted in said housing and at least partially surrounding said drive element;
   said wrap protector having a radially outwardly directed flange referred to said rotational axis;
   a rotatably driven component;
   said flange and said component being mutually adjacent to conjointly define a gap therebetween;
   said wrap protector defining an interior space communicating with said gap; and,
   said apparatus having an ancillary opening connecting said interior space to the ambient air so as to permit the ambient air to be drawn into said interior space and exit into said gap during operation of said apparatus.

18. A portable handheld work apparatus comprising:

a housing having an air intake opening formed therein;

a drive motor mounted in said housing;

a fan wheel driven by said drive motor for drawing a cooling airflow into said housing through said air intake opening and for moving said cooling airflow to said drive motor;

a drive element rotatably driven about a rotational axis;

a wrap protector fixedly mounted in said housing and at least partially surrounding said drive element;

said wrap protector having a radially outwardly directed flange referred to said rotational axis;

a rotatably driven component;

said flange and said component conjointly defining a gap therebetween; and, said wrap protector having a cylindrical section arranged in said housing so as to permit said cooling airflow to flow around and in contact with said cylindrical section.

* * * * *